(12) United States Patent
Windrem

(10) Patent No.: US 6,421,095 B1
(45) Date of Patent: Jul. 16, 2002

(54) KEY PRIORITY FOR A MIX/EFFECT BANK HAVING MULTIPLE KEYERS

(75) Inventor: Kevin D. Windrem, Grass Valley, CA (US)

(73) Assignee: Grass Valley (US), Inc., Nevada City, CA (US)

( * ) Notice: Subject to any disclaimer, the term of this patent is extended or adjusted under 35 U.S.C. 154(b) by 0 days.

(21) Appl. No.: 09/364,554

(22) Filed: Jul. 29, 1999

(51) Int. Cl.[7] ............................ H04N 9/74; H04N 5/268
(52) U.S. Cl. ............................. 348/585; 348/586
(58) Field of Search ................................. 348/584, 585, 348/586, 598, 705, 590, 591, 593, 594, 587, 588; H04N 9/74, 5/268

(56) References Cited

U.S. PATENT DOCUMENTS

| | | | | |
|---|---|---|---|---|
| 3,604,849 A | * | 9/1971 | Ole ............................ | 348/585 |
| 4,207,596 A | * | 6/1980 | Pires .......................... | 348/598 |
| 4,853,784 A | * | 8/1989 | Abt et al. .................... | 348/585 |
| 4,858,011 A | * | 8/1989 | Jackson et al. ............. | 348/705 |
| 4,947,254 A | * | 8/1990 | Abt et al. .................... | 348/585 |
| 6,281,941 B1 | * | 8/2001 | Windrem .................... | 348/585 |

* cited by examiner

*Primary Examiner*—Michael Lee
(74) *Attorney, Agent, or Firm*—Smith-Hill and Bedell

(57) ABSTRACT

A mix/effect bank has its capability doubled by increasing the number of keyers input from two to four. The outputs from the keyers are routed through a crosspoint matrix for form a current and a next stack representing the priority of the keyer outputs from highest to lowest. The current stack is input to a current priority combiner and the next stack is input to a next priority combiner. The output of the current priority combiner is a program video output bus and the output of the next priority combiner is a preview video output bus. The two buses are input to a transition mixer, the output of which is coupled through a program/preview switch to the program video output bus. The transition mixer passes the output of the current priority combiner to the program video output bus except when the transition is made between preview and program, at which point the transition product is provided to the program video output bus. At the completion of the transition the next stack is switched to the current stack in the crosspoint matrix and the transition mixer again passes the output from the current priority combiner to the program video output bus.

3 Claims, 1 Drawing Sheet

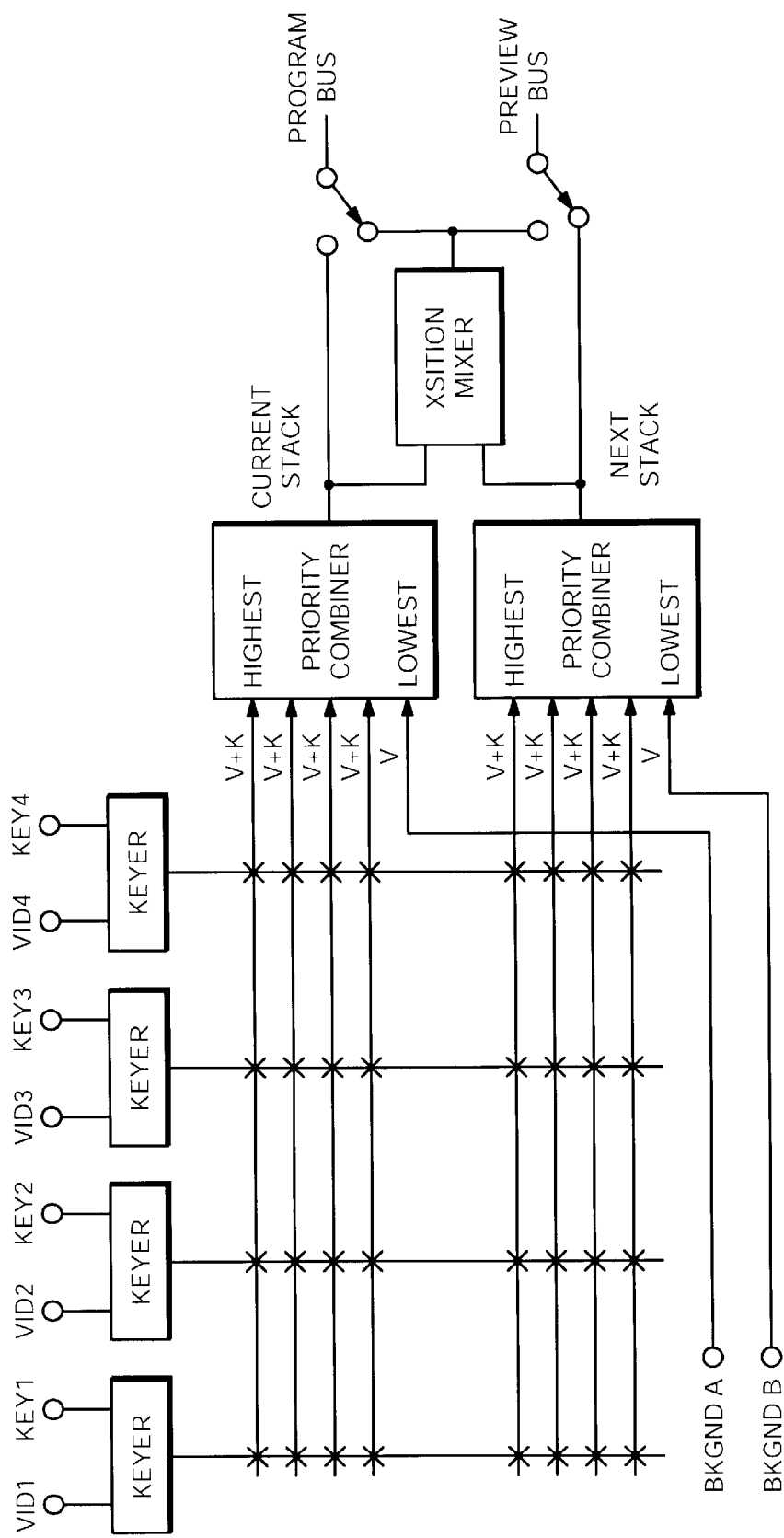

KEY PRIORITY FOR A MIX/EFFECT BANK HAVING MULTIPLE KEYERS

BACKGROUND OF THE INVENTION

The present invention relates to video signal processing, and more particularly to key priority for a mix/effect (M/E) bank having multiple keyers.

The current state of the art in production video switchers divides functionality into mix/effect (M/E) banks, each having two keyers plus a pair of background buses. As programs become more complex, the compositing capability of a four bank switcher (3 M/E banks plus a program/preset bank) is no longer sufficient. Increasing panel depth to accommodate additional M/E banks is impractical. Adding keyers to an M/E bank is a practical solution to the need for additional compositing, but complicates the specification of keyer priority. With just two keyers, one keyer is always over the other. With three or more keyers, a binary selection is not sufficient.

What is desired is a simple way to specify keyer priority for an M/E bank having more than two keyers.

BRIEF SUMMARY OF THE INVENTION

Accordingly the present invention provides key priority for a mix/effect bank having multiple keyers, specifically more than two keyers. The outputs of the keyers is input to a crosspoint matrix r outer, which router provides a current stack output representing the priority of the keyers for a program video output bus and provides a next stack output representing the priority of keyers for a preview video output bus. The current and next stacks are input to respective current and next priority combiners in order of highest to lowest priority. The outputs of the combiners are input to a transition mixer, the output of which is coupled to a program video output bus via a program/preview switch, and the output of the next priority combiner is coupled to a preview video output bus via the program/preview switch. The transition mixer passes the output from the current priority combiner to the program video output bus except when the transition is made from the program output to the preview output.

The objects, advantages and other novel features of the present invention are apparent from the following detailed description when read in conjunction with the appended claims and attached drawing.

BRIEF DESCRIPTION OF THE SEVERAL VIEWS OF THE DRAWING

The FIGURE is a block diagram view of a mix/effect bank having multiple keyers according to the present invention.

DETAILED DESCRIPTION OF THE INVENTION

Referring now to the FIGURE a plurality of keyers 12 (more than two), each having a video signal and a key signal as inputs and providing at an output a shaped video signal that is the combination of the input video and key signals, have their outputs as inputs to a key signal crosspoint router 14 having two sets of outputs. Each set of outputs from the crosspoints of the router 14 are input to respective priority combiners 16. Also input to each combiner 16 is a separate background video signal. The outputs from the crosspoints of the router 14 are input in sequence from highest priority to lowest (background) priority. Each set of outputs from the router 14 form a priority "stack", and two stacks are defined—a current stack and a next stack.

The outputs from the combiners 16 are input to a transition mixer 18 and to one pole of a program/preview switch 20. The output from the transition mixer 18 is applied to the other pole of the program/preview switch 20. The outputs from the program/preview switch 20 are a program video and a preview video, with the program video being the output of the transition mixer 18 and the preview video being the output from the combiner 16 having the next priority stack.

As shown in the FIGURE two identical combiners 16 composite four keys over a background video in a fixed priority. One combiner 16 provides a composite of any or none of the four keys over the A background video. Its output produces the composite that is on air when no transition is in progress. This is the current stack or composite. The second combiner 16 produces a similar composite that is used during a transition. It represents what the program will look like after the transition. This is the next stack. The next stack may involve the same or different keyers at the same or different priorities as the current stack.

When a transition is not in progress, the transition mixer 18 passes the current stack to its output. During a transition (mix, wipe, etc.) The transition mixer 18 reduces the visibility of the current stack at the same time the next stack is revealed. How this occurs depends upon the type of transition. At the end of the transition the settings for the next and current stacks, as well as the top and bottom halves of the router, are swapped and the transition mixer is again set to pass the current stack.

The crosspoints of the router 14 between the keyers 12 and combiners 16 determine the key priority for the current and next stacks as well as which keys actually contribute to each stack. For example, if Key 1 is routed to the "Highest" input for the current stack and Key 2 and Key 3 are routed to the next two inputs, Key 1 appears on top of the other keys, Key 2 appears in between the other keys, and Key 3 appears on the bottom. The A background video signal fills any area which is not covered by any of the keys. If the next stack has Key 4, Key 3 and then Key 2, a transition replaces Key 1 with Key 4 at the highest priority and Keys 2 and 3 swap priorities. If no background transition is desired, the signals feeding the A and B background video signals are set to the same source.

Look ahead preview shows an operator what the program output will look like after a transition so that the operator may quickly verify that the M/E bank is properly set before making the transition. The next stack provides the exact signal. The actual transition may be previewed by activating the program/preview switch 20 to its opposite position. This takes the current stack directly to the program output and puts the transition mixer in the preview path. The transition preview may occur without affecting the program output. Although the look ahead preview and transition preview features are not unique, this M/E architecture provides the required functionality without significant cost increase. Other architectures require large portions of the mixer 18 to be replicated for one or both of the preview functions. Both the combiner 16 and the transition mixer 18 are simple and low cost, but the M/E bank is very powerful and flexible.

Also adding two keyers to each M/E bank doubles the compositing capability of the production switcher without increasing the panel depth. This is accomplished by sharing the two existing keyer bus source select rows on the panel with the third and fourth keyers.

Thus the present invention provides an improved mix/effect bank by adding additional keyers and a crosspoint router between the keyers and the priority combiners to form a current stack at one combiner and a next stack at the other combiner.

What is claimed is:

1. A mix/effects bank comprising:
   - at least three keyers, each providing a shaped video output from a video input and a key input;
   - a current priority combiner having a plurality of inputs ranked in order from highest priority to lowest priority;
   - a next priority combiner having a plurality of inputs ranked in order from highest priority to lowest priority;
   - a crosspoint router coupled between the keyers and the combiners having the shaped videos as inputs and providing a current set of outputs and a next set of outputs coupled to the inputs of the current priority combiner and next priority combiner respectively;
   - a transition mixer coupled to receive the outputs from the combiners as inputs and providing an output; and
   - a program/preview switch coupled to receive the output from the combiners at one pole and the output from the transition mixer at the other pole, and having outputs coupled to a program video bus and a preview video bus.

2. A method of combining at least three video/key signals with a background signal in an M/E bank comprising the steps of:
   - routing the video/key signals to form a current and a next stack of video/key signals in order of priority from highest to lowest for input to a current priority combiner and a next priority combiner respectively together with the background signal; and
   - combining the current stack of video/key signals in the current priority combiner to form a program output and the next stack of video/key signals in the next priority combiner to form a preview output.

3. The method as recited in claim 2 further comprising the steps of:
   - transitioning the preview output to the program output in a transition mixer; and
   - switching the next stack to the current stack at the completion of the transitioning step.

* * * * *